(12) United States Patent
Bayha et al.

(10) Patent No.: US 7,204,901 B2
(45) Date of Patent: Apr. 17, 2007

(54) LOW COST PROCESS FOR MANUFACTURE OF HURRICANE RESISTANT, GLASS, IMPACT RESISTANT UNITS

(75) Inventors: Charles Edward Bayha, Collierville, TN (US); James Lunde, St. Croix Falls, WI (US)

(73) Assignee: Zicron Corporation, Collierville, TN (US)

( * ) Notice: Subject to any disclaimer, the term of this patent is extended or adjusted under 35 U.S.C. 154(b) by 176 days.

(21) Appl. No.: 10/767,274

(22) Filed: Jan. 30, 2004

(65) Prior Publication Data

US 2005/0008797 A1 Jan. 13, 2005

Related U.S. Application Data

(60) Provisional application No. 60/444,203, filed on Feb. 3, 2003.

(51) Int. Cl.
*B60C 73/00* (2006.01)
(52) U.S. Cl. .................. 156/94; 156/99; 156/101; 264/36.1; 264/36.22; 264/261
(58) Field of Classification Search .............. 156/94, 156/98, 99, 101, 107, 108; 264/36.1, 36.22, 264/261
See application file for complete search history.

(56) References Cited

U.S. PATENT DOCUMENTS

| | | | |
|---|---|---|---|
| 2,496,480 A | 2/1950 | Lavin | |
| 3,271,235 A | 9/1966 | Mont | |
| 3,334,008 A * | 8/1967 | Park et al. | 428/429 |
| 3,509,015 A * | 4/1970 | Ammons et al. | 428/425.6 |
| 3,703,425 A * | 11/1972 | Delmonte et al. | 264/261 |
| 4,125,669 A * | 11/1978 | Triebel et al. | 428/412 |
| 4,225,650 A | 9/1980 | van Brederode | |
| 4,229,639 A * | 10/1980 | Koy et al. | 219/121.35 |
| 4,234,533 A | 11/1980 | Langlands | |
| 4,264,681 A | 4/1981 | Girard | |
| 4,724,023 A | 2/1988 | Marriott | |
| 5,009,694 A * | 4/1991 | Nishitani et al. | 65/115 |
| 5,505,091 A | 4/1996 | Ali | |
| 5,765,325 A | 6/1998 | DeBlock | |
| 5,853,828 A | 12/1998 | Schimmelpenningh | |
| 5,911,660 A | 6/1999 | Watson | |
| 5,937,511 A | 8/1999 | Hoffa | |
| 6,057,961 A | 5/2000 | Allen | |
| 6,101,783 A | 8/2000 | Howes | |
| 6,182,406 B1 | 2/2001 | Hunt | |
| 6,205,713 B1 | 3/2001 | Thomas | |
| 6,237,306 B1 | 5/2001 | Dlubak | |
| 6,293,059 B1 | 9/2001 | Goodwin | |
| 6,314,689 B1 | 11/2001 | Hughes | |
| 6,363,669 B1 | 4/2002 | Hoffman | |
| 6,363,670 B1 | 4/2002 | Dewitt | |
| 6,385,916 B1 | 5/2002 | Marko | |
| 6,408,592 B1 | 6/2002 | Hourani | |
| 6,421,968 B2 | 7/2002 | Degelsagar | |
| 6,450,041 B1 | 9/2002 | Ali | |
| 6,500,556 B1 | 12/2002 | Morris | |
| 2002/0197422 A1 * | 12/2002 | Trpkovski et al. | 428/34 |

* cited by examiner

*Primary Examiner*—Justin R. Fischer
(74) *Attorney, Agent, or Firm*—Venable LLP; Marina V. Schneller

(57) ABSTRACT

Liquid laminating resin systems are used to attribute hurricane resistant properties to insulated glass window units. The activated resin system is then deposited on a single piece of float glass with the containment insulating unit or the resin can be injected between the air space of an existing insulated unit. In the first case, the second piece of glass completes the insulating unit. In both cases, the resin is allowed to cure 3–4 hours. The finished insulated and impact-resistant glass unit can then be installed into the window frame structure. Preferred resins include multiple component polyurethanes and special low shrinkage polyester systems with Argon gas between the glass layers after the resin has cured.

22 Claims, No Drawings

LOW COST PROCESS FOR MANUFACTURE OF HURRICANE RESISTANT, GLASS, IMPACT RESISTANT UNITS

CROSS REFERENCE

This application claims the benefit of Provisional Application No. 60/444,203, filed Feb. 3, 2003 which is expressly incorporated by reference herein.

FIELD OF THE INVENTION

The invention relates to a novel process for converting new or existing insulated windows into hurricane resistant windows while still retaining insulating properties. Said invention can also be applied to Tornado and blast resistant applications.

BACKGROUND OF THE INVENTION

Ever since various hurricanes such as Camille in New Orleans, La., Andrew in Dade County, Fla. and Hugo in Charleston, S.C. have impacted the coastal cities in North America, replacement of existing and new tempered glass with high impact laminated windows have been the focus of various state and government agencies.

The degree and type of damage in these various cities were the subject of intensive studies to determine how the damage from high winds to buildings, both commercial and residential can be minimized. In addition to other recommendations, replacement of conventional float glass and insulated glass should be with high impact laminated windows. Prevailing opinions were that if the high winds could be kept out of the interior of the building, less damage to the structure should occur. Support for these opinions came from Hurricane Hugo which hit Charleston, S.C. in July, 1997.

Almost all of the tempered glass structures in high rise buildings failed while considerable less failure occurred with conventional laminated glass structures. Although the theory is controversial, the Florida State Building Code Agency in Dade County has instituted new and stringent requirements for high impact windows, both new and existing structures.

Insurance Companies have been the driving force for these requirements. Resistance to these changes have come from the construction industry and owners of high rise buildings who feel that these changes are too costly and will negatively impact new construction in Florida and other coastal areas in the United States.

However, other states have adopted the Dade County impact requirements opting that new window construction, meet Dade County standards. Many of the islands in the Caribbean also require these specifications in their impact resistant windows.

Initially, impact standards were so severs that windows meeting these standards were either too expensive or had other negative properties that made implementation impractical.

Currently, Dade County requirements are described in A.S.T.M. 1886-97, A.S.T.M. 1996, A.S.T.M., E-1300 and protocol PA 201,202 and 203.

Description of the Test:

Large Missile Impact

1. The subject window with frame is placed in a confining apparatus. Thickness of the window can vary but a maximum thickness of 9/16" is desirable. Area of the glass structure varies according to the application. The framing system is as important as the impact resistance of the glass laminate.
2. An air compressor cannon fires two eight foot 2' by 4' wood beams at the center and corner of the glass laminate. Impact occurs at the edge of the wood beam. An additional wood beam is fired at the frame. Distance from the cannon can vary but at impact, the beam must be traveling at 34 miles per hour. If no penetration on impact occurs with the glass and the seal remains in tact on the frame, the impact part of the test in considered a pass. The glass can break both in the front and back with spall and still be considered a pass. To insure the seal on the frame is in tact, a high pressure stream of water is sprayed on the seal for 2–5 minutes. No water penetration can occur. Qualifications are conducted individually and certified on various glass area sizes.

Although not required, glass laminate systems can be subject to original impact speed of 55 miles per hour with the above procedure. The later speed was considered too severe for the early hurricane resistant windows and was reduced to 34 miles per hour. The object of this testing is strictly as a sales tool.

3. The second part of the test involves pressure and vacuum testing. Diaphragms are placed over the impacted glass and subjected to pressure and vacuum cycling. In order to pass the structure must be capable of holding vacuum and pressure after impact. The severity of the cycling is dependent on the application. High rise buildings require maximum resistance to vacuum and pressure.
4. An optional test involves placing a metal bulb around the impacted area on the reverse side of the hit. Contact points are held in place and increasing pressure is applied and measured until rupture occurs. This test measures the strength of the structure after impact.

Small Missile Impact

1. The subject window is placed in a framing system similar to large missile impact.
2. The air compressor cannon is loaded with ten 2 grams each, round steel balls. The cannon fire these steel balls 85 miles per hour in a spray pattern at the glass laminate system. Three shots are required. No penetration or loss of seal can occur in order to pass this test.
3. All requirements of the large missile impact test apply.

Notes

1. In many cases, the large missile impact and small missile impact tests are performed on the same glass lamination systems.
2. Glass laminates that pass large missile impact will usually pass small missile impact but not necessarily visa versa.
3. Systems that pass large missile impact testing are used in areas where the possibility of impact by debris, e.g. the first five floors of a high rise or low lying condos, is high.
4. Systems that pass small missile impact testing are used in areas where debris impacts are minimal, e.g. high rise buildings and windows that are protected from direct impacts.
5. In all cases, Hurricane resistant windows must meet A.S.T.M. E1300 wind loading requirements. Except for heavy float glass, these windows must use either heat strengthened or tempered glass.

6. Requirements for Hurricane Resistant impact test have been varying from county to county and from state to state. In addition, impact codes for blast resistant glass and Tornado resistant glass are in the developmental stage. Application of the invention can be applied to these areas.

Cycling Test

After impact tests have been performed with no penetration of loss of seal, the structure is subjected to vacuum and pressure cycling with plastic diagrams on both sides of the glass and frame. No loss of vacuum or pressure can occur during the cycling. Degree of pressure, vacuum and number of cycles vary with requirements of the application.

For further details, see U.S. Pat. No. 6,450,041 (2002) and U.S. Pat. No. 5,505,091 (1996).

Prior to certification of impact resistance, the inter layer or plastic structure must be certified. Five test are performed on the inter layer or plastic structure for certification.

1. Accelerated UV exposure per 4500 hours, A.S.T.M. G26/G155
2. Textile Test, A.S.T.M. D638
3. Self Ignition, A.S.T.M. D1929
4. Rate of Burning, A.S.T.M. D635
5. Smoke Density, A.S.T.M. D2843

The certification of the inter layer or plastic sheet takes 6 months. The impact test can be performed as soon as samples are prepared and ready to be evaluated.

For additional information see above mentioned patents.

The above mentioned patents, which are relied upon and incorporated by reference herein, provide additional information.

Overview of Insulated Glass Technology and Impact-Resistant Glass Technology

Film Based Technology

For over 60 years, meltable films based on polyvinyl butyl has dominated the safety glass market. The film is placed between two pieces of float glass and then melted in an oven. Dissolved air is removed with vacuum or rolled out. The composite is then placed in an auto-clave and subjected to heat and pressure for a specified period of time. Upon cooling, the completed laminate is removed. Almost all windows and safety glass are made with this process.

However, the stringent requirement for hurricane impact testing for glass laminate made this process unacceptable.

The earliest film based approaches strengthened the interlayer by laminating polyvinyl butyl film to a high strength P.E.T.G. polyester film. Upon subsequent lamination to float glass, the film composite would now pass impact requirements. A second piece of glass could not be attached to the non-meltable P.E.T.G. film and to avoid scratching a hard coat had to be applied to the polyester film. Although the product performed, customers wanted glass on both sides. The product had to be converted to an insulated unit with another piece of glass with the autoclave process.

A subsequent approach was to use a high impact ethylene co-polymer ( ) between the glass (U.S. Pat. No. 4,225,650 and U.S. Pat. No. 6,500,556). Similar to P.V.B., Surlyn can be laminated between two pieces of glass. At 90 or 180 mils (2.25 or 4.50 mm), Surlyn based glass laminates will pass the most stringent requirements. Since it is an auto clave system, large volumes of high impact glass can be fabricated.

The change in Dade County requirements of wind loading (A.S.T.M. E1300) that imposed the use of tempered or heat strengthened glass in place of single, double and 3/16" float glass made the auto-clave process mare difficult to fabricate high volume of hurricane resistant glass.

Another film process involves the adhering of specialty film to a single piece of glass. The film is not only impact resistant and resistant to yellowing; it also controls the type and degree of radiation passing through (U.S. Pat. No. 6,057,961). The second piece of glass is applied to the film laminate and converts it to an insulation unit.

Plastic Structure

Polycarbonate (Lexan) with no glass can produce a high impact window that will maintain its integrity storm after storm. The large missile literally bounces off the material. A high performance coating developed by the manufacture helps the materials resist abrasion and U.V. damage. This approach is especially useful for sky light fabrication. In addition to high cost, customers prefer glass to glass products and converting these types of systems to insulated systems is impractical.

Liquid Lamination

This technology began in Europe sometime in the late 1970's. The Langlands patent, U.S. Pat. No. 4,234,533 (1980), described a method of bonding spaced sheets by molding resin. The seal was permeable and trapped air escaped through the seal. This patent was followed by many other patents describing various processes for making laminated glass using a liquid resin system, a diking seal and procedure for introducing the liquid between two pieces of glass at 30 mils (0.75 mm), 40 mils(1.0 mm) and 60 mils(1.5 mm).

Chemistry of these resins was usually some type of flexible unsaturated polyester or a flexible acrylic based product. In most cases, curing was either room temperature or an ultra-violent cure.

Although the liquid lamination method was more versatile, production rates were slow. One exception to this drawback was the Marriott patent, U.S. Pat. No. 4,724,023 (1988) which described a procedure that did not involve the introduction of resin between two pieces of glass. The activated resin was deposited on a thin piece of float glass which was allowed to dish in the middle. A second piece of glass was placed in an overlap position and the sides were sealed with an air permeable tape. Pressure forced trapped air out through the permeable seal. This procedure allowed a staged continuous process for making laminated glass.

As with the P.V.B. process, these systems for the most part were inadequate for hurricane resistant glass laminates. One exception is an acrylated ultra-violet cure resin that meets Dade County Systems Approval Standards. The system is one component and the interlayer is 100–120 mils (2.5–3.0 mm). The system does require tempered or heat strengthened glass.

New liquid systems that are in the testing phase are based on two component polyurethanes. These systems have exceptional impact, visual properties and low shrinkage. However, they are expensive and require special equipment for fabrication.

Composite System

These approaches involve combining liquid and film technologies. In all cases, glass is used on both sides. The interlayer is usually high impact P.E.T.G. polyester film or polycarbonate film. These systems perform well in the Dade County impact and cycling tests.

However, their drawback is the use of an adhesive on both sides of the film. The process is time consuming. In one patent, the polycarbonate casting is supported between two pieces of glass similar to an insulated unit. Preventing moisture from entering the air space is the drawback. Type of resin adhesive varies according to the type of film used. Unsaturated polyester resin can be used with P.E.T.G. film, but a urethane based adhesive or a special unsaturated polyester adhesive must be used with polycarbonate films or castings to prevent etching of the surface and destruction of visuals.

Framing of the laminated hurricane resistant windows are as important to passing Dade County requirements as is the actual window. In many cases, test failure occurs because the lamination lost seal on impact or lost seal on cycling. The literature is replete with methods of framing hurricane resistant windows. Special clamping and sealing putties are described. Some patents describe ways to clamp the structure to the frame by extending the film interlayer. Others describe methods to hang or support the window's structure in the frame such that the system can not come out of the frame and the frame actually absorbs some of the shock on impact. Care must be taken to seal the impact window into the frame in order to meet Dade County Hurricane Resistant Requirements.

SUMMARY OF THE INVENTION

The present invention provides a (fabrication system) with relatively reduced expense, relatively facile and speedy, in providing insulated glass units which are both insulated and impact resistant.

This invention relates to production of new or retrofitted high impact resistant insulated glass units, to their production and to their use. Retrofitting can employ an existing insulated window to render it high impact resistant windows while still maintaining the insulated properties. Retrofitting involves removal of installed insulated glass units. In high rise buildings, tempered, insulated windows must be replaced with high impact windows that meet Dade County Standards. To accomplish this goal, cost is going to be extremely high.

With our approach, the existing window is removed. Holes are drilled into frames, specifically and usually the spacer, allowing the addition of activated resin to an inner surface of the glass used. The window must be horizontal. With one inch air space windows, only 60–180 mils (2.5–4.5 mm) of resin is added. The resin cures to a solids in 3–4 hours. Complete cure occurs in 12–15 hours. The holes are sealed and the window is put back into the frame. The same procedure can be used on new insulated windows. Amount of resin varies with impact requirements.

An additional procedure involves adding the activated resin to a single piece of float or heat strengthened glass that had the insulating containment prior to the placement of the second piece of glass. After resin cure, the insulated glass structure is completed. Simplicity is the main advantage with the method.

The amount of resin required for passing the large missile impact varies from 90–120 mils (2.5–3.0 mm). For small missile impact, 60 mils (1.5 mm) is required for general lamination, 30–40 mils (0.75–1.0 mm) are required.

The procedure for placing liquid resin between insulated glass structures will be referred to as the Lake Method.

DETAILED DESCRIPTION OF THE INVENTION

The insulated glass structure comprises at least two sheets or laminae of glass, separated and supported by a spacer. Insulated Glass reduces heat gain or loss through glass, by using two or more sheets of glass to create a composite with dead air space that inhibits the transmission of heat and cold between the pieces of glass. Insulated glass is typically fabricated using special sealants and spacer around the perimeter of the glass forming a hermetically sealed insulated glass unit. Insulated glass units are fabricated by applying a perimeter spacer to one piece of glass. This spacer is filled with a moisture absorbing material to prevent condensation from forming inside the unit. The spacer used between the glass determines the overall thickness of the unit. This spacer contains a surface applied bead of polyisobutylene, which serves as a primary seal of the unit. The second piece of glass is then positioned over the first creating a pocket of air trapped between the two pieces of glass contained by the spacer. The units are pressed together. High performance units may be filled with an inert gas such as argon or krypton. The gas is introduced in the scaling press of automated machinery or purged through a port in the spacer on hand assembled units. Then a secondary seal is applied around the perimeter to further prevent seal failure.

The glass may be annealed/heat-strengthened glass and may be coated or uncoated. Coated glass is typically called "Lo E", meaning low emissivity. The coating is an extremely thin layer of metallic oxide that decrease the transmission of heat through the glass. The gas used between the panes of glass may be dehydrated air in cheaper units or argon and/or krypton gas in less cheap units. The spacer can be made of aluminum, although a poor choice in view its heat conductivity properties. Alternatives, including metal, e.g. stainless steel, or composite metal/rubber combinations.

In accordance with the invention, the unit comprises two panes of glass in parallel orientation supported and separated from each other by a spacer, thereby forming a space between the panes. The surfaces of the panes defining that space will be referred as inner surfaces. In accordance with the invention, the unit further comprises a resin which is liquid, prior to cure, applied to at least one of said inner surfaces.

The following factors are taken into account at arriving at the invention.

Type of Preferred Liquid Resin Interlayer
1. Cost
   Resin cost must be completive with other possible resin systems
2. Liquid Dispensing
   The activated resin must be capable of easily being mixed and dispensed continually through a dispensing machine without entrained air.
3. Adhesion to glass
   Upon curing, the resin system must have exceptional adhesion to glass to avoid future delamination under all weather conditions.
4. Impact Properties
   Flexibility (elongation), tensile strength and tensile modules must be such that the cured resin system is capable of passing Dade County Test Impact procedures and 16 CFR, 1201, CAT II impact tests
5. Visuals of Cured Interlayer
   Visuals of cured resin interlayer must be capable of passing automotive AS-2 requirements. No hazing, yellowing or other visual distortion can be observed.

6. Resin Vapor
   In order to avoid condensation of volatile vapors between the glass, uncured resin must have low vapor emissions.
7. Weathering properties
   The cured resin interlayer must be invisible to the glass structure and stay that way for 10 years minimum. No yellowing, delaminating or hazing can occur.
8. Additives
   Resin interlayer must be capable of mixing with various additions to impart particular properties.
9. Shrinkage
   Since the thickness of the cured resin will vary between 60–180 mils (1.5–4.5 mm), the shrinkage of the curing resin must be low to avoid heat lines and resin cracking.
10. Air Inhibition
    Resin must be capable of curing in the presence of air or if necessary be protected from the presence of air with an inert atmosphere.

Desired Properties
1. Shading Coefficient Properties
   With the addition of additives, cured resin should have shading co-efficient properties.
2. Fire rating Properties.
   With the addition of additives, cured resin should have fire resistant properties.
3. Impact Modifiers
   With the addition of additives, impact properties of the cured resin can be modified to meet Blast Resistant requirements.

Two types of resin systems are described in examples I and II, III, IV, V, VI. Although these examples are preferred, implementation of the invention is not limited to those resins of the Examples.

Preferred resins include polyurethane, polyesters and acrylic resins. Polyurethanes can be made from diisocyanates diisocyanate monomers, dimers, trimers or prepolymers wherein the diisocyanate is selected from the group consisting of hexamethylene diisocyanate monomer, isophone diisocyanate monomer, dicyclohexyl methane 4,4-diisocyanate. The resin can be formed with at least one component selected from the group consisting of polyols; tetrahydrofurane polymer diols; propoxylated glycols; triol; polyester glycols based on difunctional carboxylic acids and aliphatic glycols. Preferred polyester systems include a flexible low shrink polyester resin system which is formed from a reactant selected from the group consisting of phthalic anhydride, maleic anhydride, isophthalic anlydride, terephthalic anhydride. flexible, low shrink polyester resin formed from a reactant selected from the group consisting of glycols propylene glycol, ethylene glycol, dipropylene glycol, diethylene glycol, neopentylene glycol and products based on glycerin or trimethanol propane. The polyester is a low shrink polyester resin formed from a reagent selected from the group consisting of monomers, styrene, substitute styrenes, methyl methacrylic acid, dilute and multi-functional acrylates. The resin can be a flexible acrylate resins based on polyacrylic polymers and acrylic monomers, such as methylmethacrylate.

In each example, impact modifiers, shading co-efficient additives or intumescent addition can be added.

Retrofiting Windows:

The average windows in sky-rise building in Florida are two ¼" tempered glass pieces held together with insulating framing system. The air space can vary from 3/16" to 1". A double sealed framing system is used to keep moisture out. In addition, drying beads are held in the sides of the frame. In some cases, Argon gas is pumped into the air space between the glass. In some cases, one or both of the tempered glasses are shaded to minimize ultra-violet and infrared radiation.

With the new Dade County Impact Requirements, buildings at or near the sea coast must replace said windows with impact resistant windows that meet these standards within five years. Windows that are 30 feet and below are required to pass large missle impact, while windows above 30 feet must pass small missle impact. In addition, energy consideration require that the new windows maintain its insulation properties.

Replacement of existing windows with high impact window with an insulated air space is very expensive. Whether the impact window is made by autoclav or by a liquid process, the cost of the window varies from $10–$12 per sq. ft. The framing system can double this cost. Converting the high impact window to an insulating structure is still more costly.

The described invention permits the retrofitting of existing window while still maintaining insulation properties; and the process may be employed in brand new insulated units, to convert them to impact resistant insulated units.

In retrofitting the insulated window is removed from the framing system and held in vertical position so that the holes can be drilled from the bottom. This previous step is irrelevant if the process of the invention is applied to new, unused, insulated glass units. Three holes can be drilled through the insulated seal. Two 1/32" holes are drilled at the corners with the ⅛" large hole drilled in the middle (see Diagram I). The reason for drilling the holes in a vertical position is too minimize debris from the drilling getting between the glass. After the holes are drilled, the structure is placed in the horizonal position and a vacuum probe is used through the ⅛" hole to remove residual debris. Dispensing equipment is then used to pump activated resin through the ⅛" hole. It may be necessary to prime the lower layer of the glass with a priming solution. With polyester/acrylic resins, a solution of 95% of isopropyl alcohol (91%) and 5% Silquest A174 is applied via a flexible probe with a sponge applicator at the end. Residual solvent is removed by pumping nitrogen across the glass surface. With polyurethane resins, the same procedure is followed except the 5% is Silquest 1100.

After glass priming is complete, a measured amount of activated resin is pumped into the insulating cavity in a horizontal position being careful not to get any resin on the second piece. With polyurethane resins, 90–120 mils (2.5–3.0 mm) is needed to pass the large missile impact test and 60 mils (1.5 mm) to pass the small impact test. For Conventional impact glass, 30 mils (0.75 mils) of resin interlayer is required to pass the 16 CFR, 1201, CAT II test. The tempered glass thickness is usually ¼", but they can be 3/16". With low shrink unsaturated polyester and/or acrylic systems, 150 mils (3.5 mm) is needed to pass the large impact test and 90 mils (2.25 mm) to pass the small impact test after the resin has been added, the holes are sealed with putty.

After 3 hours of cure, the structure is ready to be re-installed back into the frame using Dow Coming 995 glazing putty as a sealant. Following two weeks of cure, these windows will pass all impact and insulating requirements for Dade County.

1. Optionally, prior to sealing the holes, nitrogen, argon, or freon gas can be added to replace any air that may be present.
2. Optionally, impact modifiers can be added to various resin candidates as needed to pass impact requirements.
3. Optionally, high level of lithium soap is added to the resin for shading properties.
4. Optionally, intumescent additives can be added to impart some fire rating (20 minutes).

Recommended Equipment

Various types of dispensing equipment is available for glass lamination application.

For unsaturated polyester resins, dispensing involves mixing 1% catalyst with 99% resin. Mixing and dispensers with positive displacement pumps using static mixer is accomplished continually. Cleaning of the resin head is done with uncatalyzed resin.

Both portable and large volume equipment is available from a number of equipment manufactures for dispensing both 2 component polyurethane systems and peroxide and or ultra violent cured unsaturated polyester systems.

The dispensing equipment must be capable of dispensing continually activated resin in a measured variable ratio. Said resin is then pumped between the toughened glass and into the cavity of the insulated unit placed in a horizontal configuration (See FIG. I and II). Curing occurs in 2–4 hours. Finished retrofit insulated window is re-installed back into the existing frame with silicon based putties. Alternately, the resin can be poured onto a single piece of glass with insulating containment. After cure, the insulated glass structure is complete with a second piece of toughened glass.

Machinery

If existing windows are to be retrofitted onsite, portable dispensing equipment must be used. Mixing polyol B side (3-parts) and isocyanate (1-part) can be mixed and dispensed on a continuous basis with readily available equipment. The problem is the polyol B side must be first dried off site to a moisture level of 10 ppm or less.

Mixing unsaturated polyester resins does not require pretreatment. However, if the system is 3-component, the adhesion promoter has to be added to the resin prior to dispensing. Pot life of that system is 3 days to 1 week. The blended resin can now be mixed and dispensed on a 100 to 1 ratio. Controlling this ratio with portable equipment at this ratio it is difficult and dependability over time is questionable.

To over come this problem, two part systems are recommended.

To a 5 gal. Pail of base resin (no promoters) 2% of methyl, ethyl, ketone peroxide (9%) is added and mixed.

Another 5 gal. of formulated resin containing all microingredients including adhesion promoter, but doubled in weight is prepared.

Using a low cost 1 to 1 ratio mixing and dispensing equipment, the formulated resin and activated resin is pumped between the glass easily and reliable at minimum cost. Cleaning of the mixing head is accomplished with uncatalyzed resin.

Impact/Insulated Windows

In addition to the ability to retrofit existing windows on site, the present invention can also make impact/insulated windows on a plant scale.

Step One—Tempering

Float glass is converted to tempered or heat strengthened glass via a tempering oven.

Step Two—Insulated Glass

Pieces of temper glass is primed continuous with either a Silquest A174 or Silquest A1100 solution. The insulated glass is made continuously using a double seal system with equipment. One tempered glass piece is primed while the other piece of tempered glass that does not come in contact with activated resin is not primed.

Step Three—

The same procedure used with retrofitting is used with new insulated units.

For plant production, conventional mixing equipment for unsaturated polyester that can dispense on a continual basis, a 100 to 1 ratio is recommended.

For plant production, conventional mixing equipment for urethane resin that can be mixed and dispensed continuously are available from various sources.

EXAMPLES

The preferred resin systems are polyurethanes. The raw materials sources are described below:

Example I

Component A (isocyanate): Desmodor W, Bayer Corp. (reactive side)
Component B (formulated polyol)
1. Flexible polyol: polymeg 650, Penn Specialty tetrethane 650, Dupont Corp.
2. Block polyol: 1,4Butanediol, BASF
3. Cross-linking polyol: LG-650, Dow Chemical and Bayer Corp.
4. Glass Adhesion Promoter: Silquest 184 Silane (OSI)
5. Ultra-violet screener: Tinuvin 328, Ciba Corp.
6. Catalyst 1: MT-12, Air Products
7. Catalyst 2: Co-cure 44, Cas Chemical Description and Function of Raw Materials
Component A: Dicyclohexyl Methane-4,4-Diisocyanate Monomer
Component B: (formulate polyol)
1. Flexible polyol (2 approved sources)
Polymeg 650 or tetrathane 650 is based on the polymerization of tertrahydrofuran to a molecular weight of 650 and constitute the majority of the polyol side.
2. Cross-Linking polyol (2 approved sources)
LG-650 or Voranal 230-60 is a propoxylate glycerin based tri-functional polyol that will solidify the mix.
3. Block Polyol(2 approved sources)
Butane diol is a polyol that increases the hard segment in the polyurethane thus increasing resistance to high temperatures.
4. Glass Adhesion Promoter (2 approved sources)
Silquest A-187 Silane and DC 6040; Gamma-Glycidoxy propyltrimethoxysilanes
5. U.V. Screener (one approved source); 2-(2-hydroxy-3,5-di-(tert)-anyl phenyl) benzotriazole
6. Catalyst 1: (one approved source); 1,4 Butanediol Mercury, (U((orydi-2,1-ethyanediyl1,2Benzene-Dicarboxylate(2-))) Diphenyl
7. Catalyst 2: (one approved source); Dibutyl tin Dilaurate

| Typical Formulation | % WT | eqs |
|---|---|---|
| Component A: Desmodor W (eq. WT = 132) | 40.0 | 0.30 |
| Component B | | |
| 1. Polymeg 650 (mol. wt = 650; eq. wt = 325) | 50.0 | 0.15 |
| 2. Butane dial (mol. wt = 90.9; eq. wt. = 45.0) | 2.0 | 0.04 |
| 3. LG 650 (mol. wt = 250.0; eq. wt. = 83.3) | 8.0 | 0.10 |
| | | 0.29 |
| 4. Silquest 187 | 1.0 pph | |
| 5. Tinuvin 328 | 0.2 pph | |
| 6. Co-cure 44 | 0.1 pph | |
| 7. MT-12 | 0.015–0.030 pph | |

| Typical Specification for resins | |
|---|---|
| A side | |
| Color (A.P.H.A.) | <30 |
| Appearance | clear |
| Brookfield viscosity @ 25° C., | 50 cps |
| B side | |
| Color (A.P.H.A.) | 30< |
| Appearance, 25° C. | waxy liquid |
| Viscosity, 50° C. | 85 cps |
| Moisture content | <50 pph |

| Typical Specifications for Cured Polyurethane | |
|---|---|
| 1. Mix volume ratio: | 3.1 parts of side B/ 2.0 parts of side A |
| 2. NCO/OH ratio | 1.03 |
| 3. Appearance | clear |
| 4. Cure Rate (80%) | 3 hrs. |

Example II

Polyurethane—Raw Materials and Sources

Component A (isocyanate): Luxale IM, Arco Chemical (Two Sources); Isophonene Diisocyanate
  Component B (formulated polyol)
    1. flexible polyol: PPG-1000, Arco Chemical (multiple sources); propoxylated glycol (mol. wt.)
    2. block polyol: Butane diol (see Example I)
    3. cross-linking polyol: Voranol 220–260, Dow Chemical (See Example I)
    4. Glass Adhesion Promoter: Silquest 184® Silane, (OSI) (See Example I)
    5. Ultra Violet screener: Tinuvin 328, Ciba Corp. (See Example I)
    6. Catalyst I: MT-12, Air Products (See Example I)
    7. Catalyst II: Co-cure 44, Cas Chemical (See Example I)

| Typical Formulation | % Wt. | Eqs |
|---|---|---|
| Component A: (isocynate): Luxate IM (eq. wt. = 111) | 29.9 | 0.26 |
| Component B | | |
| 1. PPG-1000 (mol. wt = 1000; eq. wt. = 500) | 61.5 | 0.12 |
| 2. Butane diol (mol. wt = 90.0; eq. wt. = 45.0) | 2.0 | 0.04 |
| 3. LG 650 (mol. wt = 250.0; eq. wt. = 83.3) | 7.5 | 0.09 |
| | | 0.25 |
| 4. Silquest 187 | 1.0 pph | |
| 5. Tinuvin 328 | 0.2 pph | |
| 6. Co-cure 44 | 0.1 pph | |
| 7. MT-12 | 0.015–0.030 pph | |

| Typical Specifications for resins: | |
|---|---|
| A side | |
| Color (A.P.H.A.): | <30 |
| Appearance | Clear |
| Brookfield Viscosity @ 25° C.: | 12 cps |
| B side | |
| Color (A.P.H.A.): | <30 |
| Appearance | Clear |
| Brookfield Viscosity @ 25° C.: | 130 cps |

| Typical Specification for Cured Polycarbonate | |
|---|---|
| 1. Mix volume ratio: | 3.0 parts of B side/ 1.0 parts of A side |
| 2. NCO/OH ratio: | 1.04 |
| 3. Appearance: | clear |
| 4. Shore A Hardness: | 70 |
| 5. Cure Rate (80%) | 3 hrs. |

The above polyurethane resin examples do not limit the application to only these examples.

Equipment employed for applying these resins include means for drying the polyol side with high vacuum prior to mixing and dispensing.

Example III

Unsaturated Polyester Resins (Three Component)

Refs: U.S. Pat. No. 5,318,853, which is expressly incorporated by reference herein.

Oligomer Formation

| Reactants | Moles | Mol. Wt. | Mole Wt. | % Change | gms |
|---|---|---|---|---|---|
| Water (HOH) | 1.25 | 18.0 | 22.5 | 1.49 | 59.6 |
| Maleic Anhydride | 1.00 | 98.0 | 98.0 | 6.48 | 259.2 |
| Phthalic Anhydride | 1.60 | 148.0 | 236.8 | 15.66 | 626.4 |
| Adipic Acid | 3.00 | 146.0 | 438.0 | 28.96 | 1158.4 |
| Dipropylene Glycol | 4.50 | 134.0 | 603.0 | 39.87 | 1594.8 |
| Propylene Glycol | 1.50 | 76.0 | 114.0 | 7.54 | 301.6 |
| Totals | | | 1512.3 | 100.00 | 4000.0 |

Stabilizer: 100 ppm (ethoxylated phosphoric acid)

Cook Procedure

All ingredients are added to a four liter resin kettle equipped with mechanical stirrer, packed colunm, thermocouple, and an inert gas blanket inlet. The mix is heated with an electric mandle while stirring under an inert gas blanket up to 200° C. until the acid number of the mix is 50 or below. An inert gas sparge is applied and the mix is cooked until the acid number is 15 or below and the Gardner viscosity is between a B or C (60% solids/40% styrene).

The solids are cooled to 150° C. and thinned with 25% t-butyl styrene with additional cooling. Toluolhydroquinone (30 ppm based on total resin mix) is added to the t-butyl styrene prior to thinning.

| Formation of Final Resin (3-component) | |
|---|---|
| 1. Resin mix (25% t-butyl styrene) | 77% |
| 2. t-butyl styrene | 20.0% |
| 3. Styrene | 3.0% |
| 4. Cobalt naphthenate, 12% active | 180 ppm |
| 5. Copper naphthenate, 6% active | 20 ppm |
| 6. Lithium octoate, 2% active | 1500 ppm |
| 7. Nonyl Benzyl trimethyl ammonium chloride | 50 ppm |
| 8. Tinuvin 328 | 2500 ppm |

| Specifications: | |
|---|---|
| 1. Color (A.P.H.A.) | 50 max |
| 2. Viscosity, Brookfield, 25° C. | 200–220 cps |
| 3. Refractive index | 1.5150–1.5170 |

Reactivity:

1 gm of 50% methyl ethyl ketone peroxide(9% active)+1 gm Silquest A174 with 98 gm of above formulation. Gel time is adjusted if necessary with 10–30 ppm of toluolhydroquinone .

Gel Time=30 minutes
Peak, ° F.=110–115
Cure Time=100 minutes
Total time=140 minutes Example IV Unsaturated Polyester Resins

| Oligomer Formation | | | | | |
|---|---|---|---|---|---|
| Reactants | Moles | Mol. Wt. | Mole Wt. | % Change | gms. |
| Water (HOH) | 1.25 | 18.01 | 22.51 | 1.60 | 64.0 |
| Maleic Anhydride | 1.10 | 98.06 | 107.87 | 7.65 | 306.0 |
| Phthalic Anhydride | 0.25 | 148.11 | 37.03 | 2.63 | 105.2 |
| Adipic Acid | 4.00 | 146.14 | 584.56 | 41.45 | 1658.0 |
| Dipropylene Glycol | 4.00 | 134.17 | 536.68 | 38.05 | 1522.0 |
| Propylene Glycol | 1.60 | 76.09 | 121.74 | 8.63 | 345.2 |
| | | | 1410.39 | 100.01 | 4000.4 |

Cook Procedure:

All ingredients are added to a four liter resin kettle equipped with mechanical stirrer, packed column, thermocouple, and an inert gas blanket inlet. The mix is heated with an electric mantle while stirring under an inert gas blanket up to 200° C. until the acid number of the mix is 50 or below. An inert gas sparge is applied, and the mix is cooked until the acid number is 15 or below and the Gardner viscosity is between a B or C (60% solids/40% styrene).

The solids are cooled to 150° C. and thinned with 25% t-butyl styrene with additional cooling. Toluolhydroquinone (30 ppm based on total resin mix) is added to the t-butyl styrene prior to thinning.

| Formulation of Final Resin (2-component) | |
|---|---|
| 1. Resin mix (25% t-butyl styrene) | 77% |
| 2. t-butyl styrene | 20.0% |
| 3. Styrene | 3.0% |
| 4. Cobalt naphthenate, 12% active | 100 ppm |
| 5. Copper naphthenate, 6% active | 20 ppm |
| 6. Calcium octoate, 2% active | 100 ppm |
| 7. Tinuvin 328 | 2500 ppm |
| 8. Silquest A-171 | 0.5 pph |
| 9. Silquest Y-11597 | 0.5 pph |

| Specifications: | |
|---|---|
| 1. Color (A.P.H.A.) | 50 max |
| 2. Viscosity, Brookfield, 25° C. | 200–250 cps |
| 3. Refractive index | 1.5150–1.5190 |
| 4. Storage Stability | 6 months, min |

Reactivity:

1 gm of 50% methyl ethyl ketone peroxide (9% active)+ 99 gm of above formulation. Gel time is adjusted if necessary with 10–30 ppm of Toluolhydroquinone.

Gel Time=20–30 minutes
Peak, ° F.=120–130
Cure Time=75 minutes
Total time=140 minutes Example V Unsaturated Polyester Resin

| Reactants | Moles | Mol. Wt. | Mole Wt. | % Change | WTS |
|---|---|---|---|---|---|
| Water (HOH) | 1.10 | 18.01 | 19.80 | 5.64 | 225.6 |
| Maleic Anhydride | 1.10 | 98.0 | 98.0 | 27.95 | 1118.0 |
| Diethylene Glycol | 1.25 | 106.00 | 132.50 | 37.79 | 1511.6 |
| Ethylene Glycol | 1.25 | 62.0 | 7.80 | 2.22 | 88.8 |
| Dicyclopentadiene | 0.50 | 136.0 | 68.0 | 19.39 | 775.6 |
| Maleic Anhydride | 0.25 | 98.00 | 24.50 | 6.98 | 279.2 |
| Totals | | | 35.06 | 99.97 | 3998.8 |

Oligomer Formulation Procedure:

Charge the water, maleic anhydride, diethylene gycol, and ethylene glycol into a four liter resin kettle equipped with mechanical stirrer, packed column, thermocouple, and an inert gas blanket inlet. The mix is heated with an electric mantle while stirring under an inert gas blanket up to 200–210° C. until the acid number of the mix is less than 50. The kettle temperature is reduced to 180° C. (plus or minus 5° C.). The dicyclopentadiene is charged in three shots to the kettle with the pack column and beneath the surface of the mix. A light inert gas blanket is used to pump the dicyclopentadiene liquid. Pot temperature is controlled with cooling. After all the liquid has been added, the whole is heated for two hours at 180° C. (plus or minus 5° C.). A sample of the mix is taken and the % maleic or fumaric is measured by N.M.R. analysis. The maleic percentage and the fumaric should be less than 1.0. The pot temperature is cooled to 150° C. and the additional maleic anhydride is added to the mix under inert gas sparge. Pot temperature is raised to 200° C. (plus or minus 5° C.) and the whole is cooked under inert gas sparge and vent until A.N.O.<20 and the gardner bubble viscosity=D-E (60% solids/40% styrene). The whole is cooled to 150° C. (plus or minus 5° C.) and added to 25% styrene with 30 ppm toluol-hydroquinone.

Formulation Resin System (3-Components)

In addition to standard formulating ingredients, the product requires impact modifiers in 3–5% levels.

| | |
|---|---|
| 1. Resin mix (25% t-butyl styrene) | 75% |
| 2. Styrene | 19.0% |
| 3. Methylmethacrylate | 3.0% |
| 4. Impact modifiers | 3.0% |
| 5. Cobalt naphthenate, 12% active | 200 ppm |
| 6. Copper naphthenate, 6% active | 10 ppm |
| 7. Potassium Naphthenate, 8% active | 200 ppm |
| 8. Tinuvin 328 | 2500 ppm |
| 9. Toluolhydroquinone | 10–30 ppm |

Example of Modifiers Include but are not limited to:

tri (ethylene glycol)

Alkyl sulfonic acid ester of phenol 2 methoxy, ethyl acetyl, hydrogenated methyl ester of rosin Definition of impact modifiers for thermoset polyester resin are medium molecular weight, soluble product that increase elongation properties with minimum loss of tensile strength properties.

| Specification of Resin | |
|---|---|
| Color, A.P.H.A. | 50 max |
| Brookfield viscosity, @ 25° C., cps | 150–200 |
| Refractive index | 1.5170–1.5190 |
| Storage stability | 6 months min. |

| Reactivity of Resin (See Example III) | |
|---|---|
| Gel time | 40–50 minutes |
| Peak exotherm, ° F. | 120–140 |
| Cure Time | 80–100 minutes |
| Total time | 120–150 minutes |

Example VI

Polyester/Acrylic Resin (3 Component)

| Oligomer formula | | | | |
|---|---|---|---|---|
| Reactants moles | mol. Wt. | mole wt. | % charge | charge wt. |
| Isophthalic acid 1.0 | 166.00 | 166.00 | 58.78 | 2351.2 |
| Neopentyl glycol 1.0 | 104.00 | 104.00 | 36.83 | 1473.2 |
| Ethylene glycol 0.10 | 62.07 | 12.4 | 4.39 | 175.6 |
| | | 282.4 | 100.00 | 4.000 |
| Methyl Methacrylate 1.0 | 100 | 1.00 | — | — |

Catalyst: methane sulfonic acid: 500 ppm (2 gms)
Stabilizer: Toluolhydroquinone: 50 ppm (0.2 gms)

Oligomer Cook Procedure

1. Charge all ingredients except methyl methacrylate into a 4 L kettle equipped with mechanical stirrer, thermocouple and gas inlet.
2. Heat to 100° C. with electric mantle under light inert gas sparge.
3. Switch to blanket and cool at 200° C. until acid number is <40.
4. Seal kettle and pressurize to 10–20 psi.
5. Raise temperature to 220° C. and cook until acid number is <15.
6. Remove pressure and switch to sparge and main vent.
7. Cook until acid number is <5 and Gardner Viscosity is T-U (60% solids/40% styrene).
8. Cool to 130–140° C.
9. Add methyl-methacrylate in 3 shots.
10. Hold for 2 hours.
11. Sparge for 1 hour.
12. Cool to 100° C. and discharge into 40% styrene containing 30 ppm toluolhydroquinone

| Formulation of Finished Resin | |
|---|---|
| 1. Example VI resin (40% styrene) | 83.2 |
| 2. Styrene | 16.8 |
| 3. Cobalt Naphthenate, 12% active | 100 ppm |
| 4. Copper naphthenate | 10 ppm |
| 5. Calcium naphthenate, 8% active | 100 ppm |
| 6. Potassium octoate, 8% active | 200 ppm |
| 7. Silquest 328 | 2500 ppm |

| Specification of Finished Resin | |
|---|---|
| color, A.P.H.A. | 70 |
| % monomer | 50 |
| Brookfield viscosity, @ 25° C., cps | 80 |
| storage stability, 6 months | 1.5170–1.5190 |

| Reactivity of Resin See Example IV | |
|---|---|
| Gel time | 70–80 minutes |
| Peak, ° F. | 115–120 minutes |
| Cure time | 100–120 minutes |
| Total time | 170–200 minutes |

Some level of fire rating can be obtained with the resin containing or the addition of phosphorus and nitrogen intumenscent additives. One example of this type of additive is trimethylene diamine (2 gm)/Dimethyl methyl phosphonate (1 g)

Adding this mixture to the liquid resin will produce a cured resin with fire rated properties.

Example VII

Polyester Resin-3 Component

This polyester resin exhibits light shading properties.

| Oligomer Formation | | | | | |
|---|---|---|---|---|---|
| Reactants | moles | mol. Wt. | mole wt. | % charge | charge wt. |
| water | 1.0 | 18.00 | 18.00 | 1.28 | 51.2 |
| Maleic Anhydride | 1.0 | 98.00 | 98.00 | 6.96 | 278.4 |
| Adipic Acid | 4.0 | 146.00 | 584.00 | 41.48 | 1659.2 |
| Dipropylene Glycol | 5.0 | 134.17 | 670.00 | 47.59 | 1903.0 |
| Propylene Glycol | 0.5 | 76.09 | 38.00 | 2.70 | 108.0 |
| | | 1408 | | 100.01 | 4000.4 |

Stabilizer: Ethoxylated phosphoric acid: 100 ppm (0.4 gm)

Oligomer Cook Procedure
1. Charge all ingredients into a 4 L kettle equipped with mechanical stirrer, thermocouple, packed column and gas inlet.
2. Heat to 100° C. with electric mandle under inert gas sparge.
3. Cook at 200° C.+_5° C. until acid number is <50 with packed column.
4. Switch to main vent and sparge until acid number is <5 and gardner viscosity=B–C (60% solids/40% styrene).
5. Cool until 150° C. and discharge into 30% styrene containing 50 ppm toluolhydroquinone.

| Finished Resin Formulation | |
|---|---|
| 1. Example VII Resin (30% styrene): | 86.50 |
| 2. Styrene: | 12.0 |
| 3. Methylmethacrylate: | 2.0 |
| 4. Cobalt napthenate, 12% active: | 200 ppm |
| 5. Copper napthenate, 12% active: | 10 ppm |
| 6. Lithium octoate, 2% active: | 1 pph |
| 7. Nonoyl trimethyl ammonium chloride: | 50 ppm |
| 8. Tinuvin 328: | 2500 ppm |

| Finished Resin Specifications | |
|---|---|
| Color | Deep blue |
| % Styrene | 38% |
| % Methylmethacrylate | 2% |
| Brookfield viscosity, @ 25%, cps | 80–90 |
| Storage Stability | 6 months minimum |

The cured resin is shaded blue and does exhibit an increase in shady co-effience.

Resin Reactivity:

1 gm of 50% methyl ethyl ketone peroxide (9% active)+1 gm Silquest A174 with 98 gm of above formulation. Gel time is adjusted if necessary with 10–30 ppm of tolyolhydoquinone .
Gel Time=60–70 minutes
Peak, ° F.=120–130
Cure Time=80–100 minutes
Total time=140–170 minutes In each example, impact modifiers, shading co-efficient additives or intumescent addition can be added.

DETAILED DESCRIPTION OF THE INVENTION:

Retrofiting Windows:

The average windows in sky-rise building in Florida are two ¼" tempered glass pieces held together with insulating framing system. The air space can vary from 3/16" to 1". A double sealed framing system is used to keep moisture out. In addition, drying beads are held in the sides of the frame. In some cases, Argon gas is pumped into the air space between the glass. In some cases, one or both of the tempered glasses are shaded to minimize ultra-violet and infrared radiation.

With the new Dade County Impact Requirements, buildings at or near the sea coast must replace said windows with impact resistant windows that meet these standards within five years. Windows that are 30 feet and below are required to pass large missle impact, while windows above 30 feet must pass small missle impact. In addition, energy consideration require that the new windows maintain its insulation properties.

Replacement of existing windows with high impact window with an insulated air space is very expensive. Whether the impact window is made by autoclav or by a liquid process, the cost of the window varies from $10–$12 per sq. ft. The framing system can double this cost. Converting the high impact window to an insulating structure is still more costly.

The described invention permits the retrofitting of existing window while still maintaining insulation properties.

The insulated window is removed from the framing system and held in vertical position so that the holes can be drilled from the bottom. Three holes can be drilled through the insulated seal. Two 1/32" holes are drilled at the corners with the ⅛" large hole drilled in the middle (see Diagram I). The reason for drilling the holes in a vertical position is too minimize debris from the drilling getting between the glass. After the holes are drilled, the structure is placed in the horizonal position and a vacuum probe is used through the ⅛" hole to remove residual debris.

Dispensing equipment is then used to pump activated resin through the ⅛" hole. It may be necessary to prime the lower layer of the glass with a priming solution. With polyester/acrylic resins, a solution of 95% of isopropyl alcohol (91%) and 5% Silquest A174 is applied via a flexible probe with a sponge applicator at the end. Residual solvent is removed by pumping nitrogen across the glass surface. With polyurethane resins, the same procedure is followed except the 5% is Silquest 1100.

After glass priming is complete, a measured amount of activated resin is pumped into the insulating cavity in a horizontal position being careful not to get any resin on the second piece. With polyurethane resins, 90–120 mils (2.5–3.0 mm) is needed to pass the large missile impact test and 60 mils (1.5 mm) to pass the small impact test. For Conventional impact glass, 30 mils (0.75 mils) of resin interlayer is required to pass the 16 CFR, 1201,CAT II test. The tempered glass thickness is usually ¼", but they can be ³⁄₁₆". With low shrink unsaturated polyester and/or acrylic systems, 150 mils (3.5 mm) is needed to pass the large impact test and 90 mils (2.25 mm) to pass the small impact test after the resin has been added, the holes are sealed with putty.

After 3 hours of cure, the structure is ready to be re-installed back into the frame using Dow Corning 995 glazing putty as a sealant. Following two weeks of cure, these windows will pass all impact and insulating requirements for Dade County.

5. Optionally, prior to sealing the holes, nitrogen, argon, or freon gas can be added to replace any air that may be present.
6. Optionally, impact modifiers can be added to various resin candidates as needed to pass impact requirements.
7. Optionally, high level of lithium soap is added to the resin for shading properties.
8. Optionally, intumescent additives can be added to impart some fire rating (20 minutes).

Impact/Insulated Windows

In addition to the ability to retrofit existing windows on site, the present invention can also make impact/insulated windows on a plant scale.

Step One—Tempering

Float glass is converted to tempered or heat strengthened glass via a tempering oven.

Step Two—Insulated Glass

Pieces of temper glass is primed continous with either a Silquest A174 or Silquest A1100 solution. The insulated glass is made continuously using a double seal system with equipment. One tempered glass piece is primed while the other piece of tempered glass that does not come in contact with activated resin is not primed.

Step Three—

The same procedure used with retrofitting is used with new insulated units.

Machinery

If existing windows are to be retrofitted onsite, portable dispensing equipment must be used. Mixing polyol B side (3-parts) and isocyanate (1-part) can be mixed and dispensed on a continuous basis with readily available equipment. The problem is the polyol B side must be first dried off site to a moisture level of 10 ppm or less.

Mixing unsaturated polyester resins does not require pretreatment. However, if the system is 3-component, the adhesion promoter has to be added to the resin prior to dispensing. Pot life of that system is 3 days to 1 week. The blended resin can now be mixed and dispensed on a 100 to 1 ratio. Controlling this ratio with portable equipment at this ratio it is difficult and dependability over time is questionable.

To over come this problem, two part systems are recommended.

To a 5 gal. Pail of base resin (no promoters) 2% of methyl, ethyl, ketone peroxide (9%) is added and mixed.

Another 5 gal. of formulated resin containing all micro-ingredients including adhesion promoter, but doubled in weight is prepared.

Using a low cost 1 to 1 ratio mixing and dispensing equipment, the formulated resin and activated resin is pumped between the glass easily and reliable at minimum cost. Cleaning of the mixing head is accomplished with uncatalyzed resin.

For plant production, conventional mixing equipment for unsaturated polyester that can dispense on a continual basis, a 100 to 1 ratio is recommended, or plant production, conventional mixing equipment for urethane resin that can be mixed and dispensed continuously are available from various sources.

The invention claimed is:

1. A process of converting an insulated glass unit to an impact resistant insulated glass unit,
   wherein an insulated glass unit comprises:
   two sheets at least one of which is glass;
   a space between said two sheets; and
   a spacer, which separates and supports said at least two sheets and forms said space between said two sheets, which space is defined by inner surfaces of said two sheets wherein the process comprises;
   providing an insulated glass unit;
   accessing said space and providing a liquid resin formulation on an inner surface, of said at least one sheet of glass,
   wherein the liquid resin formulation is provided on said inner surface of said at least one sheet of glass, which is maintained in a horizontal position during which no resin is applied to a second inner surface;
   wherein a layer of said resin, which is liquid prior to cure, is cured and renders said at least one sheet of glass impact resistant; and
   producing an impact resistant insulated glass unit.

2. The process of claim 1, wherein said at least one sheet of glass is tempered or heat strengthened glass.

3. The process of claim 1, wherein the resin is selected from the group consisting of polyurethane, polyester and acrylic resins.

4. The process of claim 3, wherein the polyester is a flexible low shrink polyester resin system which is formed from a reactant selected from the group consisting of phthalic anhydride, maleic anhydride, isophthalic anlydride, and terephthalic anhydride.

5. The process of claim 4, wherein the polyester is a flexible, low shrink polyester resin formed from a reactant selected from the group consisting of glycols, propylene glycol, ethylene glycol, dipropylene glycol, diethylene glycol, neopentylene glycol and products based on glycerin or trimethanol propane.

6. The process of claim 1, wherein the polyester is a low shrink polyester resin formed from a reagent selected from the group consisting of styrene, substituted styrenes, methyl methacrylic acid, dilute and multi-functional acrylates.

7. The process of claim 1, wherein the resin is a flexible acrylate resin based on polyacrylic polymers and acrylic monomers.

8. The process of claim 1, wherein the liquid resin formulation is provided on said inner surface of said at least one sheet of glass, which is maintained in a horizontal position.

9. The process of claim 1, wherein a second sheet is a second sheet of glass.

10. The process of claim 1, wherein the resin is formed with at least one component selected from the group consisting of polyols, tetrahydrofurane polymer diols; propoxylated glycols; triol; polyester glycols based on difunctional carboxylic acids and aliphatic glycols.

11. The process of claim 1, wherein the sheets of the insulated glass unit are maintained in a horizontal position, while providing said liquid resin formulation.

12. A process for retro-fitting existing insulated windows to convert them into impact resistant insulated glass units, comprising:
   removing an insulated glass unit from a building;
   wherein said insulated glass structure comprises;
   at least two sheets or lamina, wherein at least one of said sheets or lamina is of glass; a spacer, which separates and supports said at least two sheets of glass, and forms an enclosed space between said two sheets;
   accessing said space for providing a liquid resin formulation on an inner surface of said at least one sheet of glass;
   wherein the resin is liquid prior to cure;
   curing said resin; and
   producing an impact resistant insulated glass unit,
   wherein the liquid resin formulation is pumped into the space which is in a horizontal position.

13. The process of claim 12, which further comprises installing said impact resistant insulated glass unit in a building.

14. The process of claim 12, wherein said at least one sheet of glass is tempered or heat strengthened glass.

15. The process of claim 12, wherein the resin is selected from the group consisting of polyurethane, polyester and acrylic resins.

16. The process of claim 15, wherein the polyester is a flexible low shrink polyester resin system which is formed from a reactant selected from the group consisting of phthalic anhydride, maleic anhydride, isophthalic anlydride, and terephthalic anhydride.

17. The process of claim 15, wherein the polyester is a flexible, low shrink polyester resin formed from a reactant selected from the group consisting of glycols, propylene glycol, ethylene glycol, dipropylene glycol, diethylene glycol, neopentylene glycol and products based on glycerin or trimethanol propane.

18. The process of claim 15, wherein the polyester is a low shrink polyester resin formed from a reagent selected from the group consisting of monomers, styrene, substituted styrenes, methyl methacrylic acid, dilute and multi-functional acrylates.

19. The process of claim 12, wherein the resin is a flexible acrylate resins based on polyacrylic polymers and acrylic monomers.

20. The process of claim 12, during which pumping, no resin is applied to a second inner surface.

21. The process of claim 12, wherein a second sheet is a second sheet of glass.

22. The process of claim 12, wherein the resin is formed with at least one component selected from the group consisting of polyols; tefrahydrofurane, polymer diols; propoxylated glycols; triol; polyester glycols based on difunctional carboxylic acids and aliphatic glycols.

* * * * *

UNITED STATES PATENT AND TRADEMARK OFFICE
CERTIFICATE OF CORRECTION

PATENT NO. : 7,204,901 B2 Page 1 of 1
APPLICATION NO. : 10/767274
DATED : April 17, 2007
INVENTOR(S) : Charles E. Bayha It is certified that error appears in the above-identified patent and that said Letters Patent is hereby corrected as shown below:

On the Title page, please correct the Assignee information as follows:

Item (73)    Assignee: ~~Zieron~~ Zircon Corporation, Collierville, TN (US)

Signed and Sealed this

Twenty-seventh Day of November, 2007

JON W. DUDAS
*Director of the United States Patent and Trademark Office*